Dec. 8, 1936.  I. I. HANCE  2,063,247
AUTO OIL FILTER
Filed Nov. 24, 1934  2 Sheets-Sheet 1

Isaac I. Hance
INVENTOR

ATTORNEY

Dec. 8, 1936.  I. I. HANCE  2,063,247
AUTO OIL FILTER
Filed Nov. 24, 1934   2 Sheets-Sheet 2

Isaac I. Hance
INVENTOR
BY
ATTORNEY

Patented Dec. 8, 1936

2,063,247

UNITED STATES PATENT OFFICE 2,063,247

AUTO OIL FILTER

Isaac Irving Hance, Meriden, Conn., assignor to The Cuno Engineering Corporation, Meriden, Conn., a corporation of Connecticut Application November 24, 1934, Serial No. 754,585

4 Claims. (Cl. 210—164)

This invention relates primarily to novel and improved means or methods of attaching a lubricating oil filter to an internal combustion engine or other mechanism having a recirculating lubricating system such as air compressors etc. and has for its object to provide a quickly removable method of mounting the filter so that it may be installed, inspected, or replaced with a minimum of effort and time consumption.

Another object is to eliminate the usual mounting clamps or brackets commonly used for attaching the filter to the mechanism by mounting the filter directly by a quick detachable means to the oil filler pipe or other opening in the engine or mechanism housing communicating with the oil reservoir. The filter may be an integral part of the mechanism or may be constructed as an accessory to mechanisms in prior use.

A special object is to provide an oil filter which can be readily installed by anyone on an engine which has not been provided with a filter.

Other advantages over the commonly accepted methods of oil filter installation will also be noticeable in this specification such as providing a simple means of inspecting the flow of oil at the filter outlet while the mechanism to which it is attached is in operation, although this is not essential to the invention.

Another object of this method of mounting is to reduce to a minimum the amount of tubing necessary to make the filter installation inasmuch as the filler pipe or other opening comprising the mounting means constitutes at least a portion of the discharge pipe of the filter. From the foregoing it will be seen that this method of mounting a filter very greatly reduces the cost of construction and installation.

Referring to the drawings

Fig. 7 shows a modification which substitutes an interior inlet pipe with a sliding connection for the filter.

Figure 1:
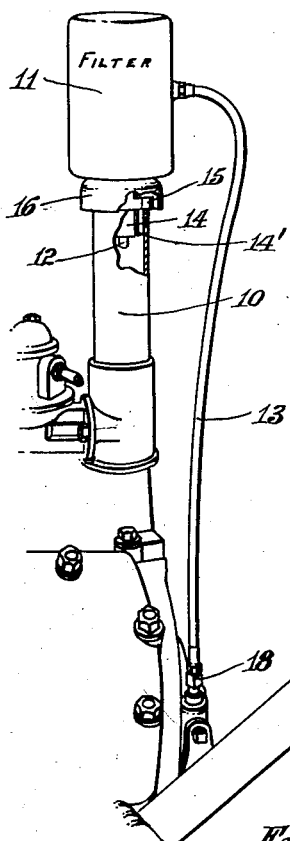
Fig. 1 is a perspective view showing one form of the invention.

Fig. 1 shows the rear end of the engine of an automobile provided with an upwardly extending pipe 10 through which the oil for the crank case is supplied. Detachably supported on the usual filler pipe 10 but in spaced relation thereto is a filter casing 11 containing any convenient type of filtering unit. The oil supplied to the filter enters through the tube 13 and is discharged through the pipe 12 shown in Fig. 2 as being within the supporting pipe 10 but spaced therefrom in order that the pipe 10 may be vented if desired.

Figure 2:
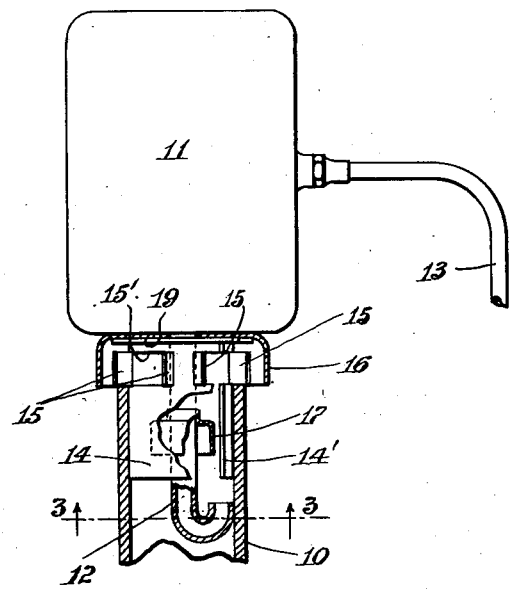
Fig. 2 is a view partly in section showing the manner in which the filter of Fig. 1 is mounted.
Figure 3:
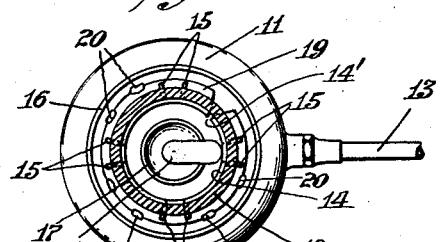
Fig. 3 is a section on the plane of the line 3—3 of Fig. 2.
Figure 4:
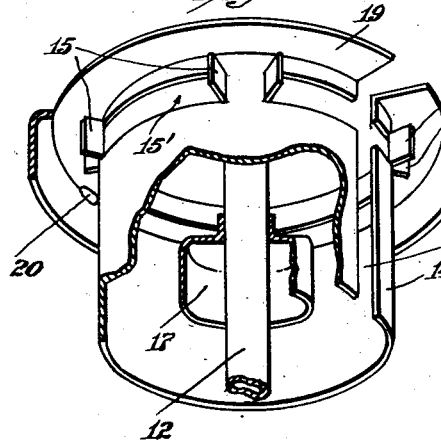
Fig. 4 is a perspective view with parts broken away to show the positioning sleeve, drip cup, etc., on the lower end of the filter.

A resilient sleeve 14 telescopes with the pipe 10 for securing the filter casing in position. As illustrated in Figs. 2 and 4, where it is desired to vent the pipe 10, portions of this yieldable sleeve 14 are bent up at 15 to constitute spacing lugs on which the weight of the filter casing 11 is borne, or transmitted to the top of the pipe 10. The portion of the sleeve 14 from which these lugs were stamped therefore provides openings 15' through which the pipe 10 is vented. If no vent is desired the lugs may be omitted.

In Fig. 4 is shown one type of construction in which the sleeve 14 is provided with a slit or opening 14' to provide a desirable yieldability.

A guard or projecting skirt portion 16 is secured to the base of the filter casing to extend over the vent openings, if provided, at the top of the pipe 10 to protect it against the entrance of dirt and foreign matter getting into the oil.

The oil pressure in the system is sufficient to force the oil up through the tube 13 and through the filter 11.

The sleeve 14 provides a quick detachable connection between the filter casing and the pipe so that when fresh oil is to be poured into the filler pipe 10 the filter casing is disconnected from the pipe, the supply tube 13 being flexible and long enough to allow such quick detachment of the filter casing.

The engine is usually stopped before separating the filter from the pipe 10 when new oil is to be poured into the crank case or when a filter is to be replaced, nevertheless there will usually be some oil in the filter which has not entirely drained out and to guard against oil dripping from the discharge pipe 12 on to the engine or elsewhere we provide a drip cup 17 as shown in Figs. 2 and 4 secured around the filter discharge pipe 12 but spaced from the sleeve 14. Any drops of oil on the lower end of the pipe 12 can then run down into the drip cup 17 when the filter casing is inverted and after it has been removed.

The lower end of the supply tube 13 is provided with a suitable connection 18 for attachment with a part of the oil pressure line of the engine or mechanism.

Another advantage of this drip cup 17 is that in replacing the filter on the pipe 10 any small amount of oil which may have run down the outside of the pipe 12, will then collect in the drip cup 17 and be returned or caused to run down the outside of the pipe 12 when the filter casing is replaced. In this way there will be no danger of any oil running down the inside of the sleeve 14 and dripping on to the engine or elsewhere.

The top of the sleeve 14 is provided with a bent-over flange portion 19 preferably spot welded at 20 to the guard 16 adjacent the periphery of the flange 19. The sleeve 14 and guard 16 are secured to the casing 11 in any convenient manner such as by spot welding or otherwise.

Figure 5:
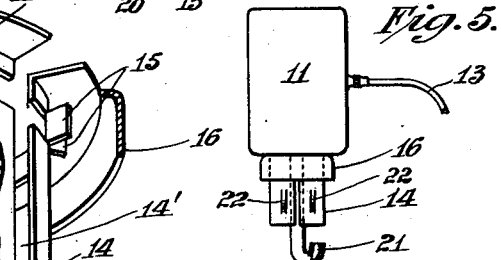
Fig. 5 shows a filter with a hook-like outlet.

In those installations where it is not always convenient to stop the engine or mechanism when adding fresh oil, the end of the discharge pipe may be made in the form of a hook 21 as shown in Fig. 5 so that the filter may be removed, inverted and hung from the edge of the tube 10 by means of the hook form and as its discharge orifice is still within the pipe 10, the mechanism need not be stopped when supplying fresh oil and furthermore the flow through the filter can be inspected. This figure also shows resilient members 22 formed by slitting the sleeve 14 and pressing the bars between the slits outwardly thus providing a means for frictionally holding the filter in the pipe 10.

The connection between the filter casing and the pipe 10 need not necessarily be of the type illustrated but other forms of connections may be used, for example, this sleeve might fit outside the pipe or both outside and inside.

Figure 6:
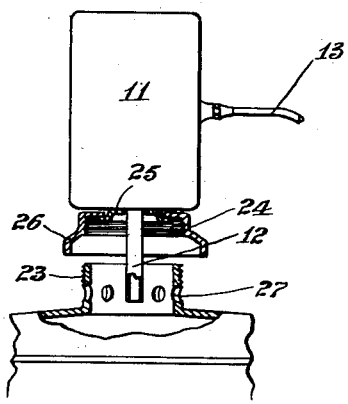
Fig. 6 shows a swivel screw cap connection for the filter.

In Fig. 6 the inlet 23 is externally threaded to receive the ring 24 which has a swivel connection with the flanged plate 25 on the bottom of the filter case. The flange 26 guards the air vents 27.

Fig. 7 shows a method of construction which dispenses with the flexible tube 13 shown in Figs. 1 etc. and in which the oil inlet and the outlet 12 are in the same end of the filter and quite closely positioned in respect to one another. The inlet tube 50 which carries oil from the pressure lubricating system from the engine or mechanism is a sliding and substantially oil tight fit in the filter casing and the filter may be retained in its proper location by any of the methods previously mentioned or described, the method of Fig. 6, however, being illustrated.

In installations where the filtered oil is not directed to a part requiring lubrication, it is not essential to provide a by-pass or pressure relief valve. In installations where the filtered oil is directed to a part requiring lubrication, it is desirable to provide a by-pass around the filter between the tube 13 and pipe 12, such by-pass passage containing a pressure relief valve which is normally closed but which opens and allows the oil to by-pass the filter in case the filter should become clogged. This by-pass may be located either close to the filter or adjacent the crank case and connection 18 or incorporated in the filter itself.

It will be readily understood that where a vented form of quick detachable filter mounting is used, an air filter such as a felt pad or a tube or a compact mass of fine wire or fabric may be incorporated in the venting means to form an air filter allowing ingress of air but excluding all particles of dust and other finely divided foreign matter and this construction may be incorporated in conjunction with a suitable air outlet forming a ventilating system for the oil reservoir, and of course also in conjunction with an oil filter.

The outlet pipe 12 in Figs. 1 to 4 may be either straight or curved to provide a hook as shown in Fig. 5. The drip cup 17 may be used with either form.

I claim:

1. In a system of the character described, a filter unit having an inlet and an outlet, and means for detachably mounting the unit at the filling inlet of an oil reservoir, and means for temporarily supporting the unit inverted and in use at the filling inlet of the reservoir.

2. The combination with a pipe through which lubricating oil is supplied to a motor, of a filter enclosed in a casing supported by said pipe, a discharge pipe from the filter casing entering the first mentioned pipe, a supply pipe for the filter connected to the oil pressure line of the engine whereby the oil pump pressure is sufficient to force the oil through the filter, said filter casing being mounted on the oil filling pipe by means of a quick-detachable connection, and an inverted cup secured on said filter discharge pipe.

3. The combination with a pipe through which lubricating oil is supplied to a motor, of a filter enclosed in a casing supported by said pipe, a discharge pipe from the filter casing entering the first mentioned pipe, a supply pipe for the filter connected to the oil pressure line of the engine whereby the oil pump pressure is sufficient to force the oil through the filter, said filter casing being mounted on the oil filling pipe by means of a quick-detachable connection, and an inverted cup secured on said filter discharge pipe, said cup being spaced from the oil filling pipe and sleeve so that the filling pipe may be vented.

4. The combination with a pipe through which lubricating oil is supplied to the crank case of a motor, of a filter casing having a resilient sleeve adapted to be slid along said pipe for frictionally and quickly attaching and detaching said filter casing, an inverted cup shaped guard over the top of said pipe, means for supporting said casing and cup in spaced relation on said pipe to vent said pipe while the filter casing is in position, a filter discharge pipe extending into said supporting pipe, and another inverted cup shaped member around said filter discharge pipe within said supporting pipe and radially spaced therefrom.

ISAAC IRVING HANCE.